US007249571B2

(12) United States Patent
Allis

(10) Patent No.: US 7,249,571 B2
(45) Date of Patent: Jul. 31, 2007

(54) AQUARIUM HAVING IMPROVED FILTRATION SYSTEM

(75) Inventor: Anthony J. Allis, Bronx, NY (US)

(73) Assignee: Mag-Life LLC, Scarsdale, NY (US)

( * ) Notice: Subject to any disclaimer, the term of this patent is extended or adjusted under 35 U.S.C. 154(b) by 205 days.

(21) Appl. No.: 10/960,213

(22) Filed: Oct. 7, 2004

(65) Prior Publication Data

US 2005/0076851 A1 Apr. 14, 2005

Related U.S. Application Data

(60) Provisional application No. 60/561,229, filed on Apr. 9, 2004, provisional application No. 60/510,698, filed on Oct. 9, 2003.

(51) Int. Cl.
*A01K 61/00* (2006.01)
(52) U.S. Cl. ..................................... 119/261
(58) Field of Classification Search ............... 119/261, 119/259, 255, 246; 210/169
See application file for complete search history.

(56) References Cited

U.S. PATENT DOCUMENTS

| 2,636,473 A | | 4/1953 | Schwartz et al. | |
|---|---|---|---|---|
| 2,871,820 A | | 2/1959 | Hayden | |
| 2,935,199 A | | 5/1960 | Willinger | |
| 3,119,774 A | | 1/1964 | Arak | |
| 3,814,254 A | | 6/1974 | Schatz | |
| 3,827,560 A | | 8/1974 | Morton | |
| 3,929,101 A | * | 12/1975 | Katz | ........................... 119/260 |
| 4,006,711 A | * | 2/1977 | Frank | ........................... 119/256 |
| 4,047,847 A | | 9/1977 | Oikawa | |
| 4,639,314 A | | 1/1987 | Tyer | |
| 4,735,715 A | | 4/1988 | Willinger | ..................... 210/169 |
| 4,817,561 A | * | 4/1989 | Byrne et al. | ................. 119/260 |
| 4,842,727 A | | 6/1989 | Willinger et al. | ........... 210/169 |
| 4,861,468 A | * | 8/1989 | Willinger et al. | ........... 210/169 |
| 4,894,151 A | * | 1/1990 | Woltmann | .................... 210/169 |
| 4,921,614 A | * | 5/1990 | Frickman et al. | ........... 210/695 |
| 4,932,786 A | | 6/1990 | Hihara et al. | |
| 4,957,623 A | * | 9/1990 | Henzlik | ....................... 210/169 |
| 4,985,181 A | * | 1/1991 | Strada et al. | .................. 261/87 |
| 5,039,286 A | | 8/1991 | Point et al. | .............. 417/424.1 |

(Continued)

Primary Examiner—Yvonne R. Abbott
(74) Attorney, Agent, or Firm—Ostrolenk, Faber, Gerb & Soffen, LLP

(57) ABSTRACT

An aquarium which includes a tank having a pump and an under gravel filter disposed in the tank below the pump. The under gravel filter includes a hollow bubble dispersing base plate having a perforated top surface and an overlying substrate. An air conduit is provided for introducing air into the pump. The pump is connected to the plate such as to pump blended oxygenated water and air into the interior of the plate to thereby cause oxygenated water and bubbles to exit upwardly through the perforated top surface of the plate and into and through the substrate. The pump includes a free floating magnetic impeller. A rotational torque generating unit is provided to rotate the impeller. The rotational torque generating unit includes a magnetic drive disk and a motor for rotating the magnetic drive disk. The pump and rotational torque generating unit are aligned with each other such that a magnetic field is established between the magnetic drive disk and the magnetic impeller, the magnetic field rotating upon rotation of the magnetic drive disk to thereby rotate the impeller.

28 Claims, 9 Drawing Sheets

U.S. PATENT DOCUMENTS

| | | | |
|---|---|---|---|
| 5,055,005 A | 10/1991 | Kletschka | 417/356 |
| RE33,899 E | 4/1992 | Tyer | |
| 5,195,877 A | 3/1993 | Kletschka | 417/356 |
| 5,238,367 A * | 8/1993 | Ellis et al. | 416/188 |
| 5,256,282 A | 10/1993 | Chang et al. | |
| 5,269,914 A | 12/1993 | Englert | |
| 5,282,961 A * | 2/1994 | Ellis et al. | 210/169 |
| 5,313,912 A * | 5/1994 | O'Dell | 119/246 |
| 5,470,208 A | 11/1995 | Kletschka | 417/410 |
| 5,603,831 A * | 2/1997 | Hickok | 210/601 |
| 5,611,679 A | 3/1997 | Ghosh et al. | |
| 5,658,136 A | 8/1997 | Mendler | |
| 5,692,885 A | 12/1997 | Langer | |
| 5,695,651 A | 12/1997 | Froud | |
| 5,799,612 A * | 9/1998 | Page | 119/260 |
| 6,015,272 A | 1/2000 | Antaki et al. | 417/356 |
| 6,027,318 A | 2/2000 | Shimanuki et al. | |
| 6,030,188 A | 2/2000 | Nojiri et al. | |
| 6,283,061 B1 * | 9/2001 | Dunn | 119/246 |
| 6,447,265 B1 | 9/2002 | Antaki et al. | 417/354 |
| 6,468,041 B2 | 10/2002 | Ozaki | 417/44.1 |
| 6,551,078 B2 * | 4/2003 | Huang | 417/420 |
| 6,575,717 B2 | 6/2003 | Ozaki et al. | |
| 6,689,315 B2 * | 2/2004 | Linker et al. | 422/45 |

* cited by examiner

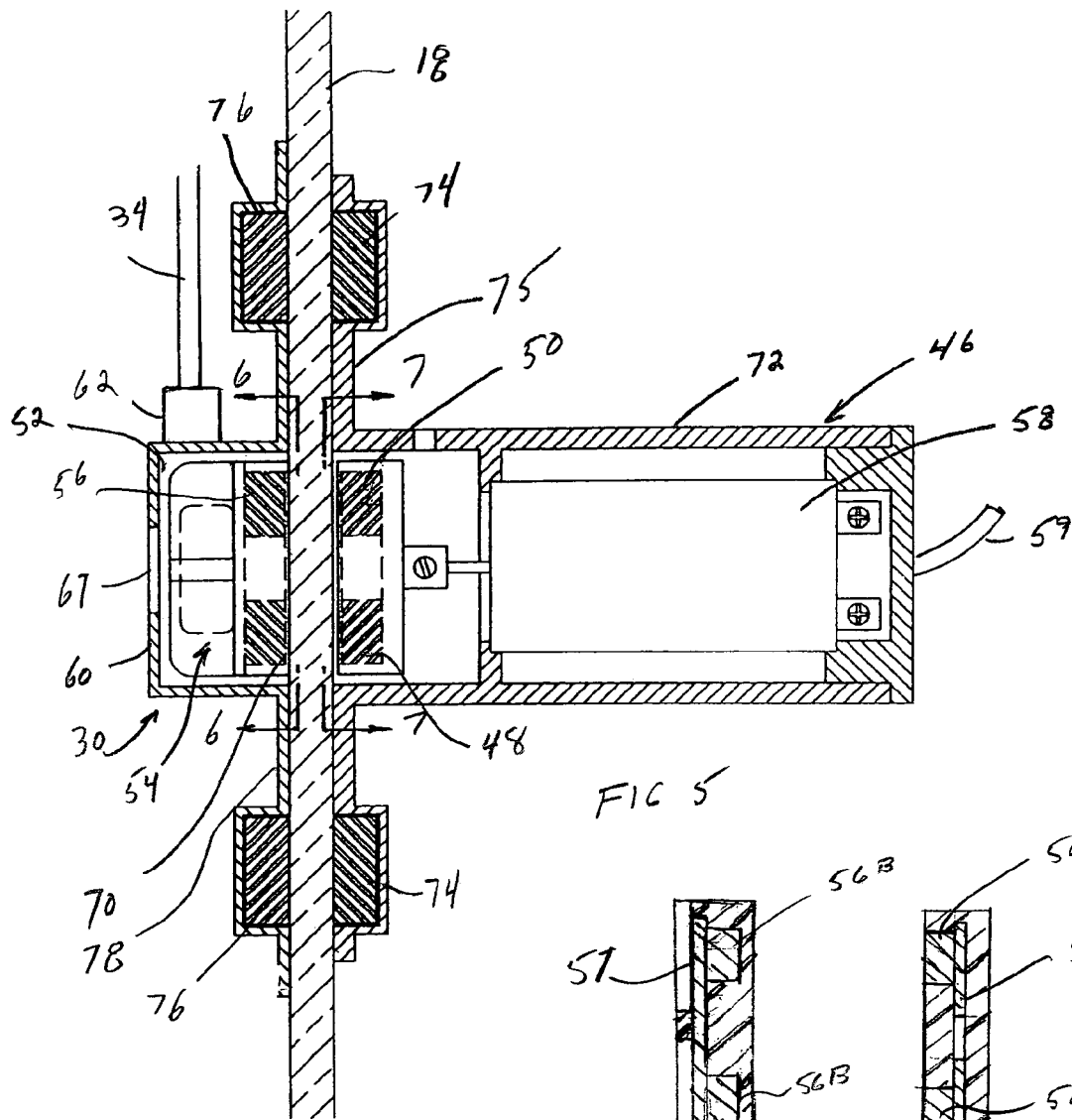
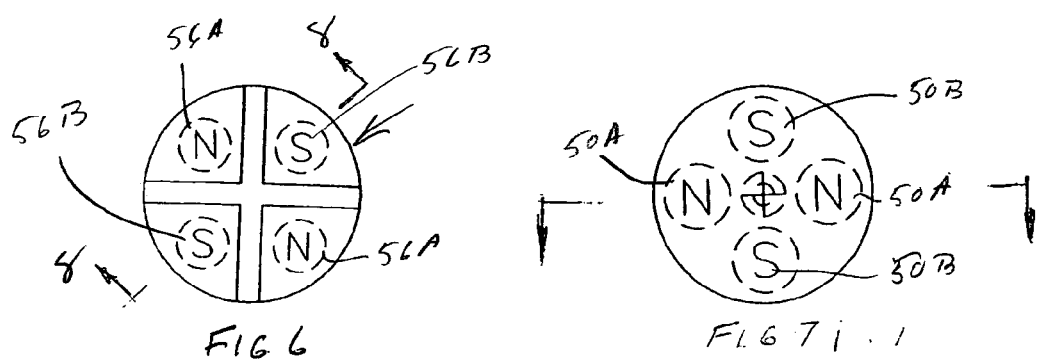

AQUARIUM HAVING IMPROVED FILTRATION SYSTEM

CROSS-REFERENCE TO RELATED APPLICATIONS

This application is based on and claims the benefit of U.S. Provisional Application No. 60/561,229, filed Apr. 9, 2004 entitled "FREE-FLOATING MAGNETIC TORQUE TRANSFER DRIVE SYSTEM AND NEW FILTER" and of U.S. Provisional Application No. 60/510,698, filed Oct. 9, 2003 entitled SUPERCHARGED BIO-LIFE UNDER SUBSTRATE BASE PLATE," the respective entire disclosures of which are incorporated by reference herein.

BACKGROUND OF THE INVENTION

The present invention relates generally to aquariums and, more particularly, to aquariums having new and improved filtration systems.

Generally, there are three types of filtration required for aquariums: mechanical, biological and chemical. Mechanical filtration capture particles such as uneaten food, bits of plants, fishes waste, etc., from the water. Biological filtration provides for the growth of a colony of beneficial bacteria that will eliminate harmful toxins in the water. Chemical filtration uses a chemical agent, such as activated carbon, to remove compounds that cause odors, discoloration of the water and certain chemical contaminants.

A number of different type filters are employed to provide the requisite filtering, such as corner filters, under gravel filters, power filters, cannister filters and wet/dry filters.

Corner filters typically comprise clear plastic boxes which sit inside the tank. An air pump bubbles air through an air lift tube, which forces water through carbon and filter floss or other media mechanically and chemically filtering the water. Colonies of beneficial bacteria build up on the media, providing excellent biological filtration. Corner filters, however, are unaesthetic, take up space in the tank, and require more frequent maintenance than other filters. Additionally, the required maintenance also removes the beneficial bacteria.

Under gravel filters work by slowly passing water through a substrate of gravel, which sits on top of a perforated base plate. The water can be pumped with an air lift, with bubbles of air lifting the water in a vertical tube attached to the filter base plate. Increased water flow can be achieved with submersible pumps, called power heads, attached to the lift tubes.

Under gravel filters make good biological filters and will foster large colonies of beneficial bacteria which neutralize toxic ammonia. They also are good at catching all debris in the water. Unfortunately, the filter quickly clogs up as all the uneaten food and other pollutants and particles choke off areas of the substrate. As greater and greater areas of the substrate choke, it results in destruction of the beneficial bacteria which decay and now add a bio load to the system. At a certain point, the remaining beneficial bacteria are overrun, resulting in a tank which is no longer able to maintain the viability of its inhabitants (a "dead tank") which must be cleaned and reinitialized. To avoid this, it is necessary to frequently clean the substrate. Typically, this is done by regular vacuuming of the substrate. Unfortunately, the cleaning process results in removal of the beneficial bacteria colonies. Another problem might occur if an under gravel filter is used with a submersible pump. In this case, there is a safety risk from electric shock when work is done in the aquarium without first shutting down the electricity to the pump.

Another common type of filter is the power filter. There are many styles of power filters, but the most common hangs on the back of the tank. A siphon tube pulls water from the tank into the filter box and passes the water though a mechanical filter (typically a porous foam sponge). The sponge doubles as a biological filter. An internal pump then returns the filtered water into the aquarium.

The foam sponge can be easily inspected for clogging or removed for cleaning, but must be cleaned regularly to remove the solid wastes before they decompose and dissolve back into the water. Cleaning must be done in such a way, however, that the bacteria colony in the sponge is not substantially destroyed through the use of detergents or tap water with chlorine. Even if done properly, however, beneficial bacteria get removed with the debris Canister filters have some similarities with the "hang on tank" style of power filters, but are designed to provide more powerful filtration. Typically, the water is pumped, at moderate pressure through a filter material, such as glass wool, or a micron filter cartridge. Canister filters are especially useful in aquariums which generate a lot of waste. For these filters to be effective they must be frequently cleaned, to avoid the decomposition of waste in the water stream. These filters usually sit on the floor below the tank, but also can hang on the tank, and in some designs, even sit inside the tank, in which case they are called a "submersible filter". As discussed above, in this latter case there is a problem of electrical shock when the aquarium is serviced without first shutting down the electricity to the filter pump.

Wet/dry filters, also known as trickle filters, work on the principle that colonies of bacteria grow best in the presence of well-oxygenated water. By "trickling" water over unsubmerged media, wet/dry filters provide a very large air/water surface area. Many things can be used for the media, with the best providing great amounts of surface area, while at the same time having large openings to reduce the tendency to clog and ensure efficient gas exchange. Generally, the problem of clogging of the media is reduced by pre-filtering the water with an efficient mechanical filter.

Although all of the foregoing filters can work effectively, they do have some common drawbacks. First, they require mechanical filters. Secondly, they require frequent maintenance which disturbs the natural balance of the tank. Additionally, those prior systems which employ submersible pumps present electrical hazards and are relatively noisy. Sounds are magnified underwater and are a terrible source of stress for fish.

Further, although all existing systems are partially successful in keeping most problems temporarily in check, they do not address one of the major problems which is maintenance of the substrate. As a result, the substrate must still be vacuumed regularly and a substantia amount of water replaced to keep the tank viable. Even if this is done, however, the balance in the tank is never stable and varies between clean and sterile to dirty and toxic.

SUMMARY OF THE INVENTION

It is a general object of the present invention to provide an aquarium and filtration system which avoid the drawbacks of prior aquariums and filtration systems and whose components perform together over extended periods of time to provide optimal condition for both the inhabitants of the aquariums and the colonization of beneficial bacteria and to maintain such conditions without minimal external intervention.

More, specifically, it is an object of the present invention to provide aquariums having new and improved filtration systems that do not require mechanical filters, and which are quieter, smaller, safer, less costly, more efficient than prior systems and which require less and simpler maintenance.

These and other objects of the invention are achieved by an aquarium which includes a tank, a pump disposed in the tank and an under gravel filter disposed in the tank below the pump. The under gravel filter includes a hollow bubble dispersing base plate having a perforated top surface. The pump is connected to the plate such as to pump oxygenated water blended with air into the interior of the plate to thereby cause bubbles and oxygenated water to exit upwardly through the perforated top surface of the plate into the base of the substrate.

Custom blending and aeration inside of the pumping chamber distribute highly oxygenated water along with blended in bubbles throughout the entire substrate. This blend results in a mix of tiny and large bubbles, each playing its role in maintaining the substrate. Large bubbles vent forcefully enough to unsettle even large debris and enable the substrate to remain free of clogs which would cause choking of the substrate. The tiny bubbles vent everywhere, ensuring full aeration everywhere. Even if some areas never get vented by large bubbles and start to clog, the clog will catch the tiny bubbles which will accumulate and combine. This will continue until the upward force overcomes the resistance of the clog, whereupon the combined tiny bubbles will vent, thus clearing the clog.

In accordance with one aspect of the invention, the pump includes a free floating magnetic impeller disposed therein.

In accordance with another aspect, a rotational torque generating unit is provided to rotate the impeller. The rotational torque generating unit includes a magnetic drive disk and a motor for rotating the magnetic drive disk disposed therein. The pump and rotational torque generating unit are aligned with each other such that a magnetic field is established between the magnetic drive disk and the magnetic impeller, the magnetic field rotating upon rotation of the magnetic drive disk to thereby rotate the magnetic impeller.

Because it is free floating, the pump is free of any bearings, bushings, shafts and any and all other structure which would restrain its position or its angle and axis of rotation. It is held in place only by its own magnetic field linking to that of the matched magnetic field of the magnetic drive disk. Additionally, tolerances are not critical since the free floating impeller is not affected if misaligned.

Advantageously the impeller includes a disc-shaped member having a plurality of vanes and a plurality of permanent magnets and wherein the rotatable magnetic drive disk includes a plurality of permanent magnets disposed on one surface thereof, the number and location of the permanent magnets of the rotatable magnetic drive disk being coincident with the number and location of the permanent magnets of the impeller.

A feature of the invention is the provision of respective focusing disks for each set of magnets which results in a magnetic sandwich which causes nearly all of the magnetic field to be focused between the drive disk and the impeller.

In accordance with another feature of the invention, the first and second housings have respective flanges containing respective mounting magnets, the mounting magnets of the first and second housings being arranged to interact with each other such that first and second housings may be connected to each other by mutual magnetic attraction of their mounting magnets.

In accordance with one aspect of the invention, bubble dispersing apparatus for an aquarium includes a hollow base plate having a perforated top surface and an inlet port for connecting a pump to the plate such as to pump a blend of oxygenated water and air into the interior of the plate to thereby cause bubbles to exit upwardly through the perforated top surface of the plate.

In accordance with another aspect of the invention, rather than a pump being connected to the base plate, an impeller is disposed in the plate for drawing a blend of water and air into the interior of the plate.

Advantageously, the substrate includes particles having a size, shape and/or density such that particles are easily moved by the bubbles and water exiting from the perforated top surface of the plate, thereby creating a negative buoyance substrate forming a fluidized-bed.

In accordance with an aspect of the invention, an aquarium tank may comprise a bottom wall in the form of a quadrilateral having first and second front corners and first and second rear corners. First and second front frame members extend upwardly from the first and second front corners, respectively, and first and second rear frame members extend upwardly from the first and second rear corners, respectively. A front wall extends between the first and second front frame members, opposed side edges of the front wall being received respectively in the first and second front frame members. A rear wall extends between the first and second rear frame members, opposed side edges of the front wall being received respectively in the first and second rear front frame members. A first side wall extends between the first front frame member and the first rear frame member, opposed side edges of the first side wall being received respectively in the first front frame member and the first rear frame member. A second side wall extends between the second front frame member and the second rear frame member, opposed side edges of the second first side wall being received respectively in the second front frame member and the second rear frame member.

In accordance with an aspect of the invention, a first upper frame member extends between the first front frame member and the first rear frame member, first and a second upper frame member extends between the second front frame member and the second rear frame member. A first top element top having opposed side edges is slidably received respectively in the first and second upper frame members to thereby enable the first top element to be slid in opposite directions along a plane extending from the first and second front frame members to the first and second rear frame members. A second top element top having opposed side edges is slidably received respectively in the first and second upper frame members to thereby enable the second top element to be slid in opposite directions along a plane extending from the first and second front frame members to the first and second rear frame members.

In accordance with one feature of the invention, a light source is mounted on one of the first and second top elements to irradiate light into the tank, whereby the amount of light irradiated into the tank depends on the relative positions of the first and second elements.

In accordance with another feature of the invention, at least one of the first and second top elements is made of a translucent colored material so that the light irradiated into the tank is light of said color.

In accordance with another feature of the invention, each of the first and second top elements has a width extending in a direction from the first and second front frame members to the first and second rear frame members which is approximately half of the distance extending from the first and second front frame members to the first and second rear frame members so that when one of the first and second top elements is in its forward most position and the other of the first and second top elements is in its rearmost position the first and second top elements cover substantially the entire top of the tank.

In accordance with an aspect of the invention, an aquarium may comprise a tank; a pump disposed in the tank; an air conduit for introducing air into the pump; and an under gravel filter disposed in the tank below the pump, the under gravel filter including a bubble dispersing base plate, the plate being hollow and having a perforated top surface and the pump being connected to the plate such as to pump a blend of water and air into the interior of the plate to thereby cause bubbles and water to exit upwardly through the perforated top surface of the plate.

In accordance with certain features of the invention, the air conduit may include a hose connected between the pump and a source of air or an air duct formed in a wall of the tank, a tube connected between the air duct and the pump and a passageway formed in the wall for connecting the air duct to the source of air.

In accordance with other features of the invention, a selectively operable valve may be provided for covering, uncovering or partially covering the passageway to regulate the amount of air supplied to the pump, and the valve may include a first magnet arranged to be movable in response to an external magnetic force for covering, uncovering or partially covering the passageway and may be movably secured to the outside surface by a second magnet positioned within the tank substantially opposite the first magnet. Advantageously, the valve may also include an air filter.

Other aspects, features and advantages of the present invention will become apparent from the following description of the invention which refers to the accompanying drawings.

BRIEF DESCRIPTION OF THE DRAWINGS

FIG. 5 is a sectional view showing a pump and rotational torque generating unit illustrating certain features of the present invention.

FIG. 6 is a sectional view along lines 6-6 of FIG. 5 showing a magnetic impeller forming part of the pump.

FIG. 7 is a sectional view along lines 7-7 of FIG. 5 showing a magnetic drive disk forming part of the rotational torque generating unit.

FIG. 8 is a sectional view along lines 8-8 of FIG. 6 and FIG. 9 is a sectional view along lines 9-9 of FIG. 7.

FIG. 14 is a plan view of a bubble dispersing base plate illustrating certain features of the present invention which forms part of the under gravel filter of FIG. 13.

DETAILED DESCRIPTION OF THE INVENTION

Figure 1:
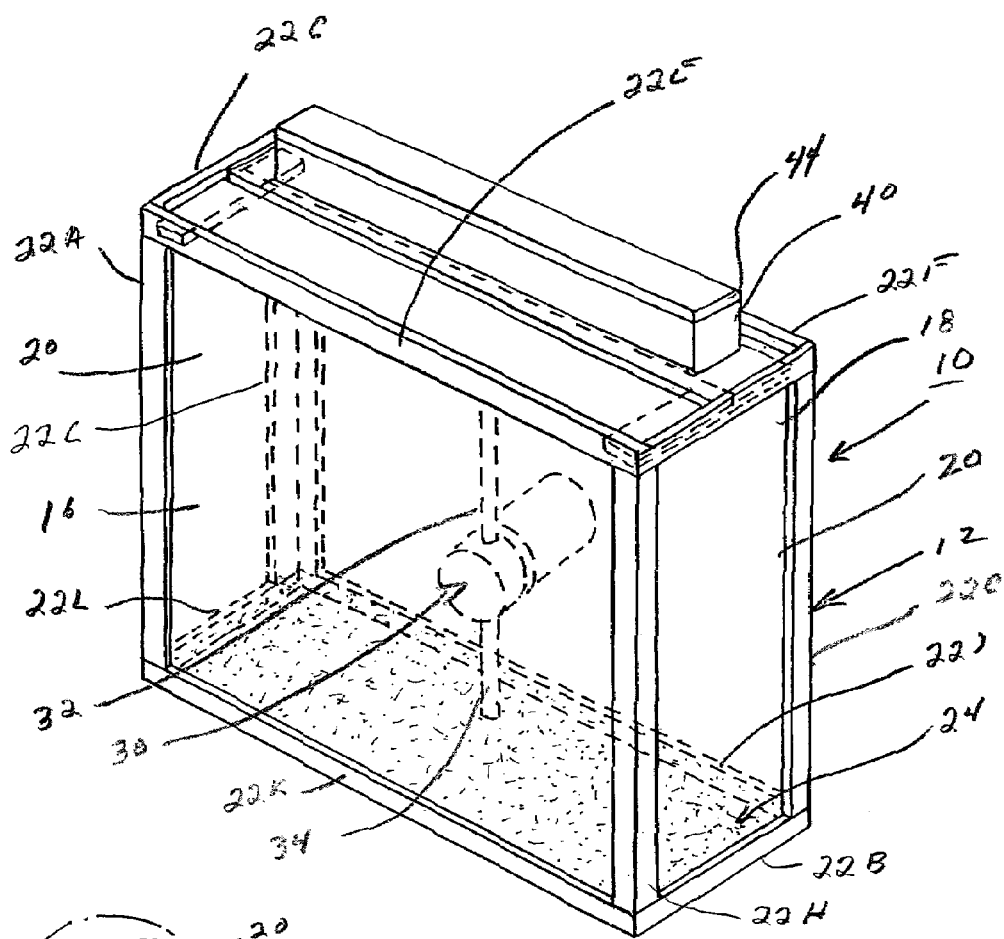
FIG. 1 is a perspective view of an aquarium illustrating certain features of the present invention.

Referring now to the drawings in which like reference characters designate like or corresponding parts throughout the several views and, in particular, referring to FIGS. 1, 2, 3, 4A-4B and 14, there is shown an embodiment of an aquarium 10 illustrating certain features of the present invention.

Figure 13:
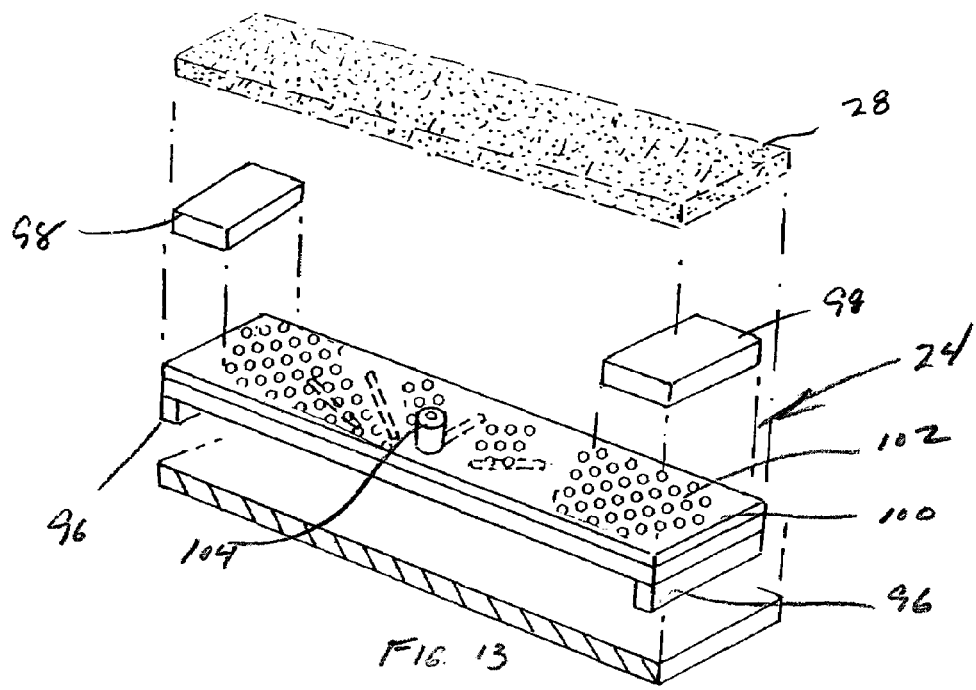
FIG. 13 is a perspective, exploded view of an under gravel filter illustrating certain features of the present invention which forms part of the aquarium of FIG. 1.

The aquarium 10 includes a tank 12 which is made of a bottom wall 14 (best seen in FIG. 13), a front wall 16, a back wall 18, and side walls 20. The bottom, front, back, and side walls 14, 16, 18 and 20, respectively, are joined together by frame members 22A-22L to provide a water tight and integrally formed enclosure. The tank 12 includes an under gravel filter 24 comprising (as best seen in FIG. 13) a bubble dispersing base plate 26 and an overlying substrate 28 of gravel, a pump 30, an air tube 32 extending between the pump 30 and the surface of water in the tank 12, and a water outlet tube 34 extending from the pump 30 to the bubble dispersing base plate 26. At least the front wall 16 of the tank 12 is made of a transparent material, such as glass or acrylic; preferably, all of the walls 14, 16, 18 and 20 of the tank 12 are made of a transparent material, such as glass or acrylic.

Figure 3:
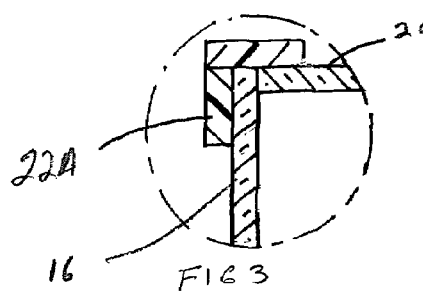
FIG. 3 is an enlarged plan view of the circled portion of FIG. 2.

At least the frame members 22A, 22B, 22C and 22H are L-shaped in cross section to receive respective edges of the walls 14, 16, 18 and 20 to facilitate assembly of the tank 12. The frame members 22A, 22B, 22C and 22H are essentially the same; accordingly, only the frame member 22A is shown in FIG. 3.

Figure 2:
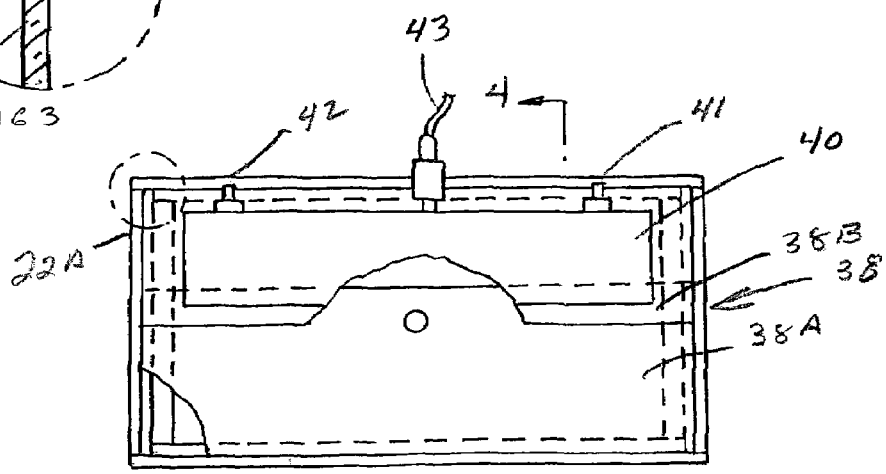
FIG. 2 is a plan view illustrating certain features of the top of the top of the aquarium.
Figure 4B:
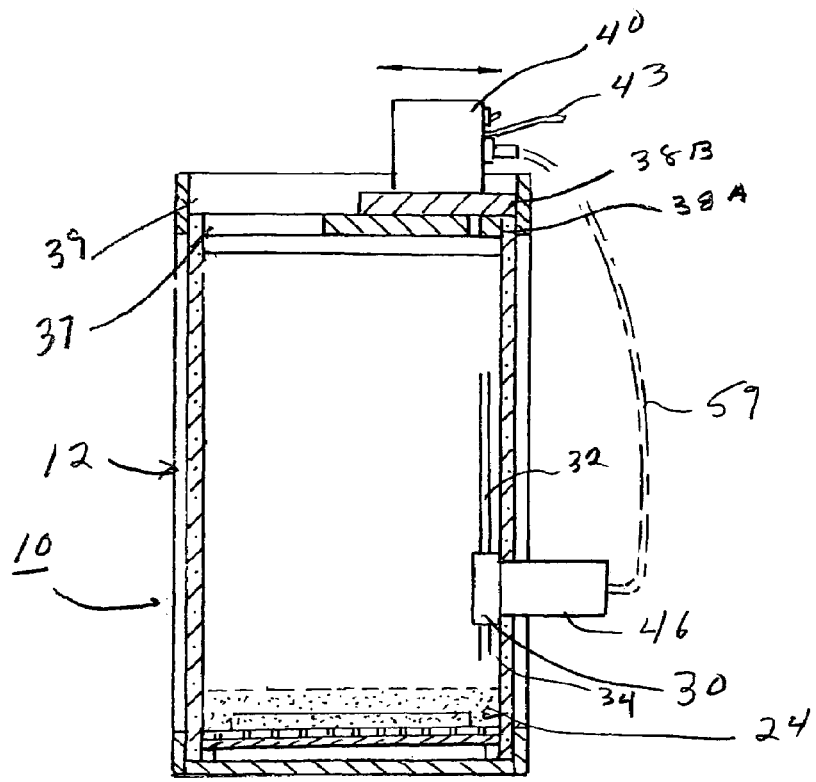
FIGS. 4A and 4B are sectional views taken along the lines 4-4 of FIG. 2.
Figure 4A:
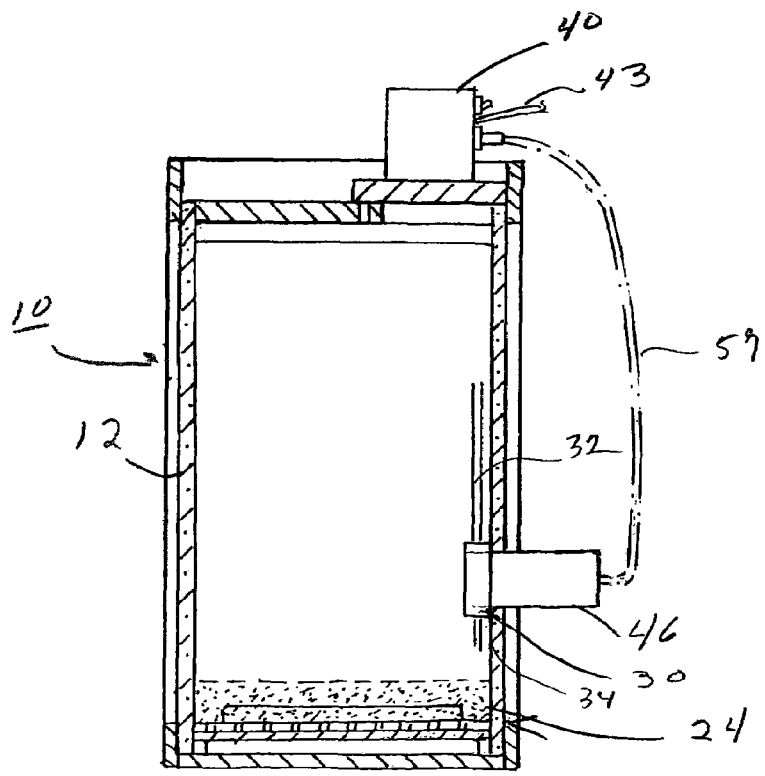

The top of the tank 12 (as seen in FIGS. 2, 4A and 4B) comprises two separate top halves 38A and 38B, each of which is slidable in respective tracks 37 and 39 in the frame members 22D-22G (since the frame members 22D and 22G are identical only the frame member 22G is shown in FIGS. 4A and 4B). Sliding the top half 38A, forward so that its front edge is in engagement with the frame member 22E and sliding the top half 38B rearwardly so that its rear edge is in engagement with the frame member 22F (FIG. 4A) results in the top halves 38A and 38B defining a cover 38 which overlies the entire top of the tank 12. It should be noted since the tracks 37 and 39 are below the top surfaces of the frame members 22A and 22B, the top halves 38A and 38B are similarly below the top surfaces of the frame members 22A and 22B; this results in the tank cover 38 being effectively inside the tank 12. As a result, any water that may be on the top halves 38A and 38B is returned to the tank 12. Additionally, the phenomenon of salt creep so troublesome in salt water tanks is substantially eliminated.

Sliding both of the top halves 38A and 38B rearwardly (FIG. 4B) opens a front portion of the top of the tank 12 to enable access to the tank 12 for feeding or other purposes. It should be noted that rather than slide the top halves 38A and 38B rearwardly both of the top halves 38A and 38B can be slid forward to expose a rear portion of the tank 12. In fact, as should be apparent, the two top halves 38A and 388B can be slid to any desired position between the front and rear of the tank 12.

The top half 38A supports a housing 40 containing a lamp (not shown) for illuminating the tank 12, as well as a power supply and associated electronics (not shown) for the lamp and the pump 30. A pair of switches 41 and 42 are provided for separately operating the lamp and the pump 30. A single power cord 43 extends from the housing and is connectable to an appropriate electrical outlet. The top 44 of the housing 40 is removable to allow for easy access to the lamp, power supply and the associated electronics in the event that service and/or replacement of any of these parts becomes necessary.

Like the walls 14, 16 18, and 20, the top halves 38A and 38B are made of a translucent plastic, such as acrylic. Advantageously, at least the top half 388B is made of a colored translucent plastic material. As a result, different lighting effects, such as varying the amount of colored light transmitted through the top half 38B, can be achieved by varying the relative positions of the top halves 38A and 38B. The lower panel can be multi colored and adjacent colors can be blended by changing the relative position of the top panels to illuminate the tank as desired.

Referring now to FIGS. 5-9, the pump 30 according to a first embodiment, is powered by a rotational torque generating unit 46 outside of the tank 12 directly behind the pump 30. The rotational torque generating unit 46 includes a magnetic drive disk 48 having a plurality of permanent magnets 50. The pump 30 includes a chamber 52 with a magnetized impeller 54 having a plurality of spaced permanent magnets 56.

The magnetic drive disk 48 is driven by a motor 58 and is magnetically coupled through the back wall 18 of the tank 12 to the impeller 54. As the motor 58 spins the attached magnetic drive disk 48, the impeller 54 spins at the exact same speed. The impeller 54 is free floating, that is, it is free of bearings, bushings, shafts and any and all other structure which would restrain its position or its angle and axis of rotation. It is held in place only by its own magnetic field linking to that of the matched magnetic field of the magnetic drive disk 48 on the motor 58. As a result, at different speeds and under different loads, the position and the axis of rotation and the angle of rotation of the impeller 54 are free to adjust to a new equilibrium for any combination of loads and speeds. The free floating design constantly adjusts for many forces and even if the impeller 54 is not balanced it is free to compensate automatically and will spin about a point off a center to adjust for this imbalance. The free floating design has many other advantages as well. If the pump 30 sucks something and blocks the ability of the impeller 54 to rotate, the impeller will either jump slightly but remain linked, allowing enough clearance to let the obstruction pass through, or be knocked off as it cannot follow the spinning magnetic drive disk 48 and, as soon as it slows more than the motor 58 slows, as will be described in more detail below, the link is broken and the impeller simple pushes off as levitational forces overcome attractive forces and stops until the motor 58 stops then it re-links. The motor 58 is therefore protected if the load ever becomes greater than expected.

Stopping the motor 58 will allow the magnetic drive disk 48 and the impeller 54 to automatically re-link, so when the motor 58 starts again the impeller 54 resumes spinning. Another problem solved by the free floating design eliminates the need to have to clean the algae and other muck which build up. The free floating design has no critical tolerances and self clears any buildup.

All electrical hazards are eliminated since the pump motor 58 is located outside of the tank and is connected to the electronics in the housing 40 by an external wire 59. Additionally, because the pump 30 is so efficient, a smaller motor 58 may be employed. More specifically, typical pump motors usually have an operating voltage of 110 v. The efficiency of the pump 30, however, enables a small motor having an operating voltage of 12 v. to be used. Accordingly, even if some unforseen accident cause an electrical connection to occur within the tank, there is no danger to either a person attending to the tank or to any of its inhabitants because of the low voltage. Having the motor 58 outside of the tank 12 also results in no heat being added to the tank 12 since the only heat generated by this design is by the motor 58 which is outside of the tank 12.

The chamber 52 is defined by a generally cylindrical housing 60 made of a nonmagnetic material, such as plastic and has an air inlet port 62, a water inlet port 64, and an outlet port 66. A mesh element (not shown) may cover the inlet port 66 to block large waste particles or tank inhabitants from entering the water inlet port 64.

The impeller 54 includes a disc-shaped member 68, preferably made of a wear resistant material, such as TEFLON polytetrafluoroethene (PTFE), having a plurality of vanes 70 (four in the illustrated embodiment) extending from the side facing away from the back wall 18 of the tank 12 and having permanent magnets 56 therein. The permanent magnets 56 correspond in number and positioning to the magnets 50 of the magnetic drive disk 48, that is, the number and location of permanent magnets 56 are coincident with the number and location of permanent magnets 50. To reduce the size of the impeller 54, the magnets 56 may be embedded directly in the vanes 70.

Because there are no bushings, bearings, shafts, etc., there are no parts to wear out and no wear other than the wear that is caused by friction between the respective mating surfaces of the tank 12 and the flat TEFLON PTFE surface on the back 70 of the impeller 54. Because of the TEFLON PTFE composition of the impeller back surface 70 and the natural lubrication of the water being pumped, this wear is practically negligible. Indeed, because of the TEFLON PTFE composition of the impeller back surface 70, even if the pump 30 is run dry for long periods wear increases only slightly.

The impeller rotation torque generating unit 46 includes a housing 72 for accommodating the motor 58 and the magnetic drive disk 48. The permanent magnets 50 are disposed on one surface (the pump 30 side) of the magnetic drive disk 48. As noted above, the number and location of the permanent magnets 50 are coincident with the number and location of the permanent magnets 56 of the impeller 54. Instead of spaced individual permanent magnets, an annular permanent magnet may be used.

The plurality of permanent magnets 50 of the magnetic disk 48 comprise north poles 50A and south poles 50B and the permanent magnets 56 of the impeller 54 comprise north poles 56A and south poles 56B. The magnetic disk 48 and the impeller 54 magnetically link to each other such that the north poles 50A from the magnetic disk 48 attract the south poles 56B of the impeller 54 and the south poles 50B of the magnetic disk 48 attract the north poles 56A of the impeller 54.

As the impeller 54 spins, it develops momentum and acts as a flywheel with gyroscopic characteristics. This provides great stability to the impeller 54 enabling it to adjust to changes in the forces acting on it and to establish a new equilibrium position by adjusting the axis and angle of rotation.

As best seen in FIGS. 8 and 9, the permanent magnets 50 of the magnetic drive disk 48 and the permanent magnets 56 of the impeller 54 are mounted on respective ferromagnetic disks 55 and 57 which serve to constrain the magnetic field to a cylinder whose diameter is essentially the same as that of the disks 55 and 57. In effect, the disks 55 and 57 are focusing disks which serve to focus the magnetic field to the area between the disks with very little leakage of the field. This results in the creation of a very strong and efficient field.

The magnetic field formed between the focusing disks is equally effective in correcting the positioning of the magnetic drive disk 48 and the impeller 54 as it is in maintaining their position. More specifically, the linkage is equally effective in maintaining position under constant speed and load as it is when speed and load are abruptly changed. This is because the repulsive forces resulting from the impeller 54 getting out of phase with the magnetic drive disk 48 are just as strong as the in-phase attractive forces. The repulsive forces just begin to become effective as the rotational force starts to equal the linking force. A slight phase shift completes the equilibrium. This phase shift begins to unbalance the attractive force, resulting in drag on the impeller 54. This drag begins to slow the impeller 54 until the repulsive forces both push it back into phase and also counterbalance the attractive forces to begin to levitate the impeller. More specifically, when the north and south poles of the magnetic drive disk 48 are not aligned with the south and north poles of the impeller 54, like poles of the magnetic drive disk 48 and the impeller 54 get closer together. This creates a corrective force and a levitational force are created. In turn, this results in a stable torque developing gyroscopic system which is highly efficient.

The pump 30 can, if desired, automatically sense if a delinking occurs. This can be done in a number of different ways. For example, when the impeller 54 de-links, the force on the shaft of the motor 58 shifts direction. A position sensor (not shown) on the motor shaft may then be used to indicate a de-linkage as the levitational forces cause the shaft to be pushed away. When this is sensed, power to the motor may be paused to cause the drive disk and the impeller disk to relink. The motor may then be automatically restarted. Another way of sensing delinking, is to monitor the current to the motor 58. When the load is removed from the motor 58, the motor current falls off dramatically. This drop off can then be used to sense delinking and the magnetic drive disk 48 and the impeller 54 relinked as described above.

The housing 72 has a flange 75 containing a pair of mounting magnets 74 which are arranged to interact with a corresponding pair of magnets 76 contained in a flange 78 extending from the pump housing 60. The housings 60 and 72 are thus secured to the back wall 18 of the tank 12 by mutual magnetic attraction.

Figure 10:
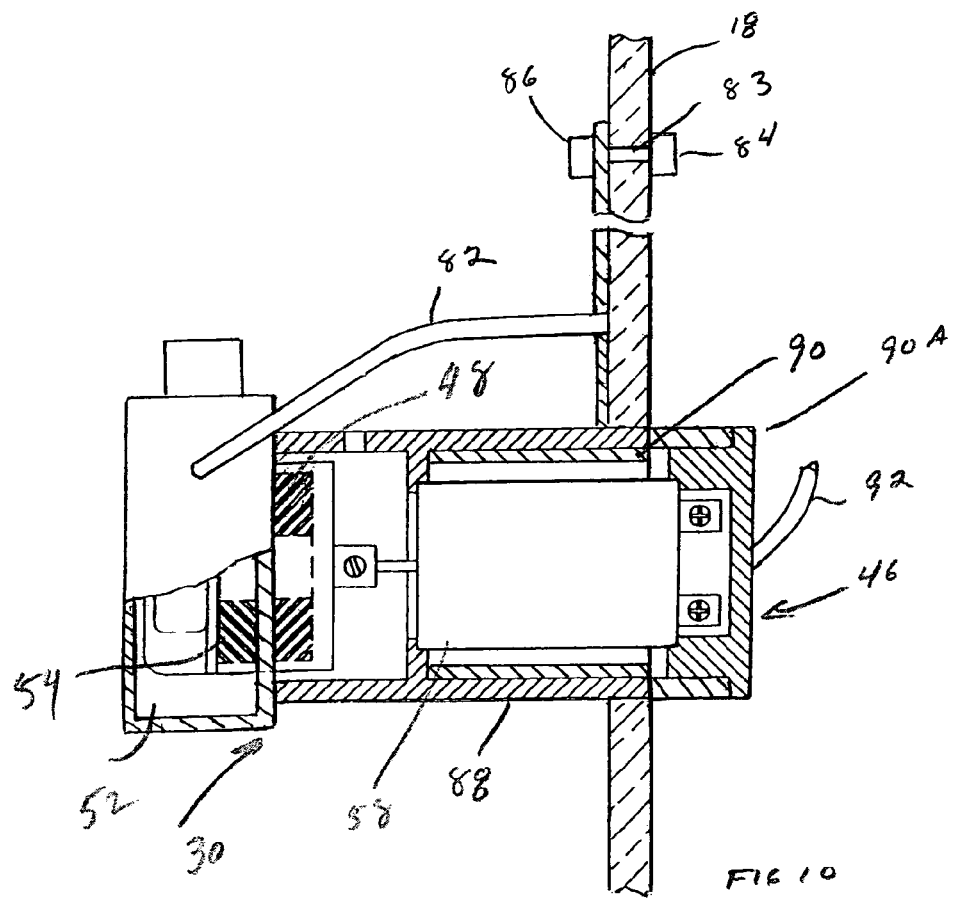
FIG. 10 is a sectional elevation view of an alternative arrangement for mounting of the pump and the rotational torque generating unit illustrating certain features of the invention.

Turning now to FIG. 10, there is shown an alterative embodiment of an aquarium 10 illustrating certain features of the invention. The aquarium 10 includes a tank 12 having a pump 30, and a water outlet tube 34 extending from the pump 30 to an under gravel filter which is the same as the under gravel filter 24 of FIG. 1 but which is not shown in FIG. 8. Instead of an air tube 32, as in the embodiment of FIG. 1, in this embodiment an air duct 80 is formed directly in the back wall 18 of the tank. An air tube 82 connects the duct 80 to the pump 30.

At the top of the back wall 18 of the tank 12 there is a small diameter passageway 83 extending from the outside of the back wall 18 to the interior of the duct 80 to enable air to be supplied to the pump 30. A valve comprising a magnet 84 regulates the blend of water and air mixed by the pump 30. Advantageously, the magnet has a through hole which communicates with an air filter. When the magnet 84 covers the passageway 83 there is no air being drawn into the duct 80. On the other hand, when the passageway 93 is fully opened, maximum air is drawn in. Movement in between these positions enables regulation of air flow to an intermediate level. The magnet 84 is secured to the tank 12 by the magnetic attraction of a magnet 86 on the inside of the tank 12 and is simply moved to regulate the air being injected by pushing it manually up or down.

A housing 88 for the pump 30 is formed directly in the back wall 18 in accordance with this embodiment with a housing 90 for the rotational torque generation unit 46 being slidably and rotatably disposed within the housing 88. The back wall of the housing 88 forms the back wall of the pump chamber 52 and the other side of the back wall of the housing 88 forms the back wall of the rotational torque generation unit housing 90. In the embodiment illustrated, most of the rotational torque generation unit housing 90 is located inside of the tank 12 with just a small portion 90A located outside of the tank. The purpose of extending most of the rotational torque generation unit housing 90 within the tank 12 is to provide a back wall 18 of the tank that is practically free of any protuberance. Alternatively, a pancake motor can be used when space is limited. However, if this is not a concern, the rotational torque generation unit housing 90 and the pump housing 88 can be located as they are in the embodiment of FIG. 1, that is, with the pump housing 88 within the tank and the rotational torque generation unit housing 90 completely outside of the tank, with the back wall 18 of the tank 12 forming a boundary between the two housings. The purpose of locating a small portion 90A of the rotational torque generation unit housing 90 outside of the tank 12 is to enable electrical connection to the rotational torque generation unit 46 to be made by a wire 92 outside of the tank 12 and to provide access to the motor housing to enable it to be rotated.

Figure 11A:
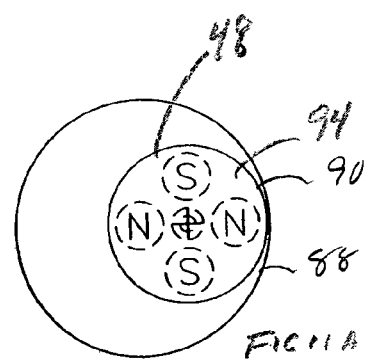
FIGS. 11A-11B are sectional elevation views of another alternative embodiment of a rotational torque generating unit, in which the motor is eccentrically mounted, showing different positions of the motor.
Figure 11B:
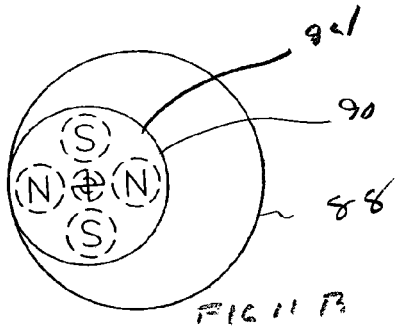

Referring now to FIGS. 11A-11B and 12A-12B, there is shown an alternative embodiment of an impeller rotation torque generating unit, designated generally by the reference numeral 94 in FIGS. 11A-11B.

Figure 12A:
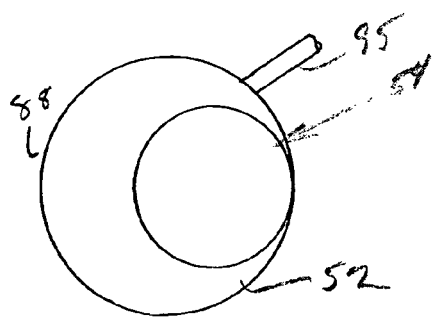
FIGS. 12A-12B are sectional views showing the positions of the magnetic impeller corresponding to the positions of the motor in FIGS. 11A-11D.
Figure 12B:
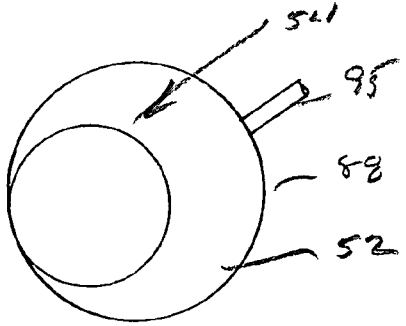

In this embodiment, the motor 58 is secured to the housing 90 such that it is eccentrically mounted with respect to the center axis of the housing. Rotation of the housing 90 causes the motor 58 and the attached magnetic drive disk 48 to move to different angular positions. In turn, this causes the magnetic impeller 54 to spin at different angular positions within the pump chamber 52. In this manner it is possible to change the position of the impeller with respect to the air inlet port, the water inlet port and the water outlet port. This enables control of the ratio of flow up and down and also the amount of air injected. FIGS. 11A and 11B illustrate different positions of the motor 58 and associated magnetic drive disk 48 and FIGS. 12A and 12B show corresponding positions of the magnetic impeller 54.

In FIGS. 11A and 11B, the housing 90 is rotated such that the motor 58 and associated magnetic drive disk 48 cause the impeller 54 to be positioned adjacent to the air inlet port 95 and, accordingly, maximum air is injected into the pump motor 58 and associated magnetic drive disk 48. In FIGS. 12A and 12B, the housing 90 is rotated such that the motor 58 and associated magnetic drive disk 48 cause the impeller 54 to be positioned away from the inlet port thus reducing the air injected into the pump chamber 52.

Referring now to FIGS. 13 and 14, the bubble dispersing base plate 26 of the under gravel filter 24 covers substantially the entire bottom wall of the tank 12. It is slightly spaced from the bottom of the tank 12 by a plurality of spacer elements 96. If desired, one or more conventional chemical filter cartridges 98 may be disposed between the substrate 28 of gravel and the bubble dispersing base plate 26. The bubble dispersing base plate 26 is sealed everywhere except for the top surface 100 which is perforated with a plurality of openings 102 extending over substantially the entire top surface of the bubble dispersing base plate 26 and which includes a pump inlet coupling 104.

Figure 15:
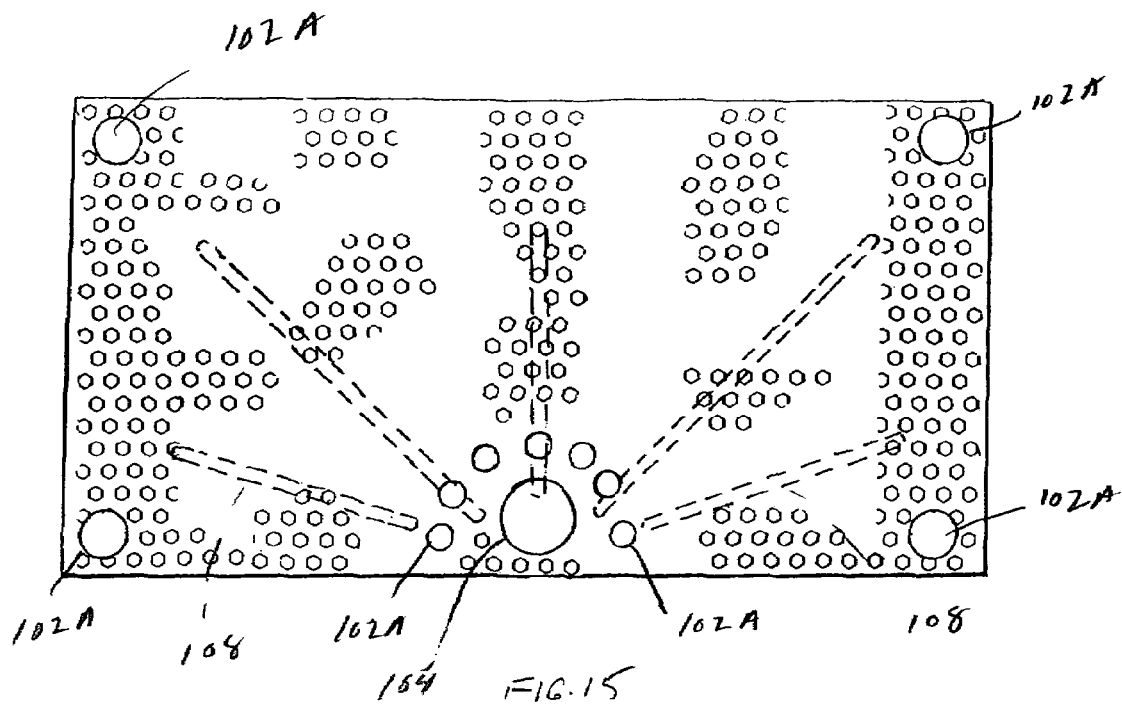
FIG. 15 is a plan view of a variation of the bubble dispersing base plate of FIG. 14 illustrating certain features of the invention.
Figure 16:
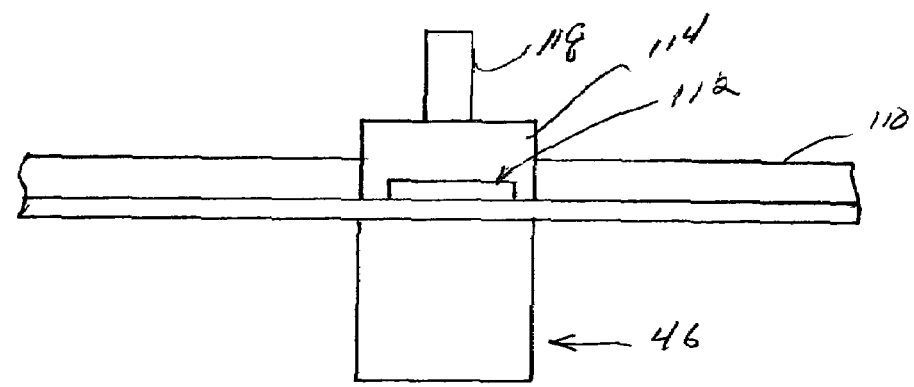
FIG. 16 is a sectional elevation view of an alternative embodiment of a bubble dispersing base plate illustrating certain features of the invention.
Figure 17:
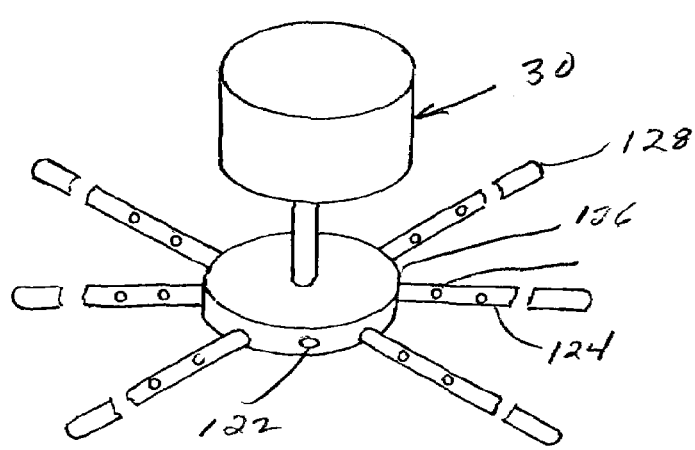

The size, shape and density of openings are selected to provide desired performance characteristics. For example, to address possible problems caused by large area bubbles forming within the plate 26, particularly adjacent the pump inlet coupling 104 and at the corners of the plate 26, larger diameter holes 102A may be formed, as shown in FIG. 15. Without the larger holes 102A, it is possible that the larger bubble regions can grow until they are almost connected, thereby restricting the escaping smaller bubbles to only a few locations. This could result in clogging of the substrate 28. Additionally, the larger bubbles, unless vented by the larger holes 102A, can cause volcanic like eruptions in the substrate 28 which, in turn, could cause water to be splashed from the tank 12.

Although the pump 30 is shown as being coupled to the under gravel filter 24, the invention is not limited to use with the type pump 30 and any other type pump can be used.

Although, gravel is shown as the substrate 28, the substrate 28 may be any type material, such as sand, pebbles, crushed coral, dolomite, or crushed glass. Advantageously, the material selected for the substrate 28 should have a density slightly greater than that of water so that the substrate particles are easily moved by the water. As a result the substrate 28 essentially has neutral buoyancy. Similarly, the particles should have a size and shape that promote easy movement. This, combined with the neutral buoyancy, causes the substrate 28 to function as a fluidized-bed in which the up flow of water causes the substrate media to act as a fluid.

Regular gravel may be used in lieu of neutral buoyancy gravel but, if this is done, both the amount and frequency of maintenance increase. This can be improved by increasing the flow rate.

This system eliminates practically all maintenance including that of employing a mechanical type filter. Other than monitoring water level, feeding and occasional gentle stirring of the substrate 28, no other maintenance is necessary.

The bubble dispersing base plate 26 can be built into the tank 12, using the bottom wall of the tank 12 as the bottom of the bubble dispersing base plate 26 and adding sides and the perforated top 100. The bubble dispersing base plate 26 is very thin and is designed to maximize turbulence with minimal flow rate restriction and to regulate the release of the air bubbles. For example, for a small to medium system the height inside the bubble dispersing base plate 26 is only ⅛ of an inch and the length and width are just slightly less than the inside base of the tank 12. It covers 100% of the base may be built in using only the perforated top 100 and the floor and walls of the tank 12 to form the sides and bottom of the bubble dispersing base plate 26. In large tanks the height of the bubble dispersing base plate 26 increases only slightly, proportional to the size of the base. A height of ¼ inch inside the bubble dispersing base plate 26 is best for up to 10 gallons; for up to 90 gallons a ½ inch height is satisfactory; and for up to 300 gallons a 1 inch height is satisfactory.

In operation, the pump 30 pressurizes the internal cavity 106 of the bubble dispersing base plate 26 by injecting a blended mix of oxygenated water and specifically sized air bubbles under pressure. Inside, the bubble dispersing base plate 26 advantageously has guides 108 to distribute this mixture for a more even distribution of the larger bubbles and to increase the size of the region of high turbulence inside the bubble dispersing base plate 26. Water and air are forced out of the perforated top surface 100 of the bubble dispersing base plate 26. When this mixture exits the top of the bubble dispersing base plate 26, it enters the bottom of the substrate 28. It constantly supplies the entire substrate 28 with all the essentials of life for the beneficial bacteria as it eliminates their waste and keeps it free of suffocating sediments. The combination of this flow with its custom blended injection of specifically sized air bubbles keeps the entire substrate 28 free of these sediments which would otherwise build up and choke off sections. The tiny bubbles pass freely through the top surface 100 of bubble dispersing base plate 26 and are not restricted like the larger bubbles. The tiny bubbles supply every region of the substrate 28 equally with a constant supply of air which slowly accumulates within the substrate 28 until a critical amount is reached to overcome the upward resistance to exit. The tiny bubbles ensure that all areas remain alive and when they eventually cause the air to percolate out they become a path of least resistance and this flow is followed by fresh oxygenated water replacing it. This flow, in combination with the gentle rattling of the substrate particles cause by the flow, keeps the area free of excess sediment.

The tiny bubbles travel equally in all directions, pass through the perforated top 100 unrestricted and are not rationed by the perforated top as the larger bubbles are. When they exit the bubble dispersing base plate 26, they accumulate in the substrate 28 and fill the entire substrate 28 at an equal rate of absorption. They do not exit the substrate 28 quickly as the large bubbles do but they constantly build up in every part of the substrate 28. As they accumulate, they reach a critical mass which overcomes the resistance to their escape from the substrate 28. In the time this takes, the collection of tiny bubbles builds up, then they begin to combine into larger ones and keep little sections of the substrate 28 within the pockets of fresh bubbles. The larger bubbles are restricted at the perforated top 100 and combine within the bubble dispersing base plate 26 and vent collectively. The tiny bubbles migrate equally in every direction and do not combine until they get trapped within the substrate 28. It is this combination of different size bubbles and overall amount that enables a reasonable amount of injected air to saturate the entire region above the bubble dispersing base plate 26. As the air is released, the force of the escaping bubbles shakes up the substrate 28, clearing any excess sediment buildup while the rising water helps keep the substrate 28 clear of clogging debris and supplied with the oxygen necessary for beneficial bacteria to eliminate it.

This process is constantly occurring as the tiny bubbles accumulate at a constant rate evenly-everywhere, and at any time any area attains a critical mass of trapped air then vents causing the area to percolate out the bubbles and the resulting volcano type release unsettles and carries away sediment in the resulting geyser like flow which accompanies the release of the trapped air.

Air is drawn into the pump 30 by the air tube 32 or the air duct 54 which function as venturies. The impeller 54 whips the air into the water inside the pumping chamber 52 causing a constant accumulation of the bubbles.

If the tank 12 is neglected, the fish overfed or the tank otherwise compromised, it still functions well. However, to correct any problems caused by overfeeding or neglect, a filter pad (not shown) may be placed on the input port of the pump 30 and the entire substrate 28 stirred using a stirrer so as to lift the excess sediment into suspension in the water. Alternatively, an external magnet (not shown) may be used to move the base plate 26 to thereby stir the substrate 28. In either case, after a few minutes, the filter pad will collect the sediment. The filter pad is then removed.

Figure 17:
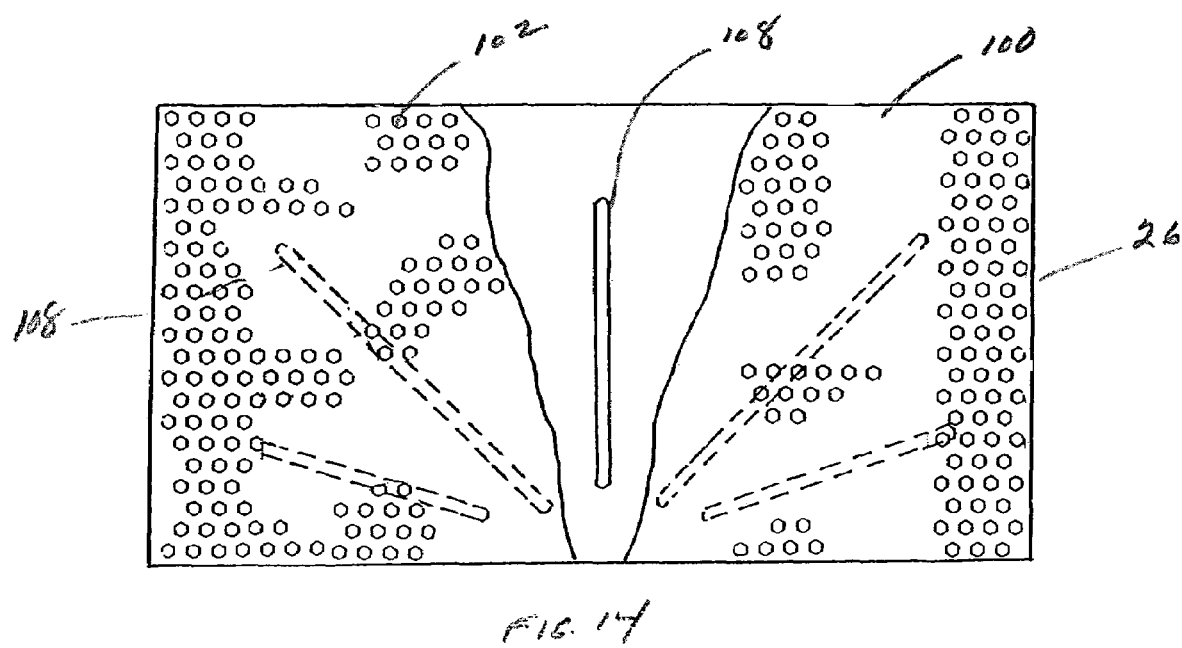
FIG. 17 is a perspective view of a further alternative embodiment of a bubble dispersing plate illustrating certain features of the invention.

Referring now to FIG. 17, there is shown an alternative embodiment of the bubble dispersing base plate 26, designated by the reference numeral 110 in FIG. 17, in which an impeller 112 similar to the impeller 54 is contained in the bubble dispersing base plate 110 itself obviating the need for a separate pump. The impeller 112 is located in a chamber 114 in the center with a slightly raised top 116. The raised top 116 of the chamber 114 helps blend in air. An intake tube 118 having a screen over its inlet is connected to the chamber. The rotational torque generation unit 46 is placed on the bottom wall of the tank 12 in alignment with the impeller 112. It may be attached to the tank 12 by mounting magnets (not shown) in the plate 110 and the rotational torque generation unit 46 or by any other suitable means.

Figure 18:
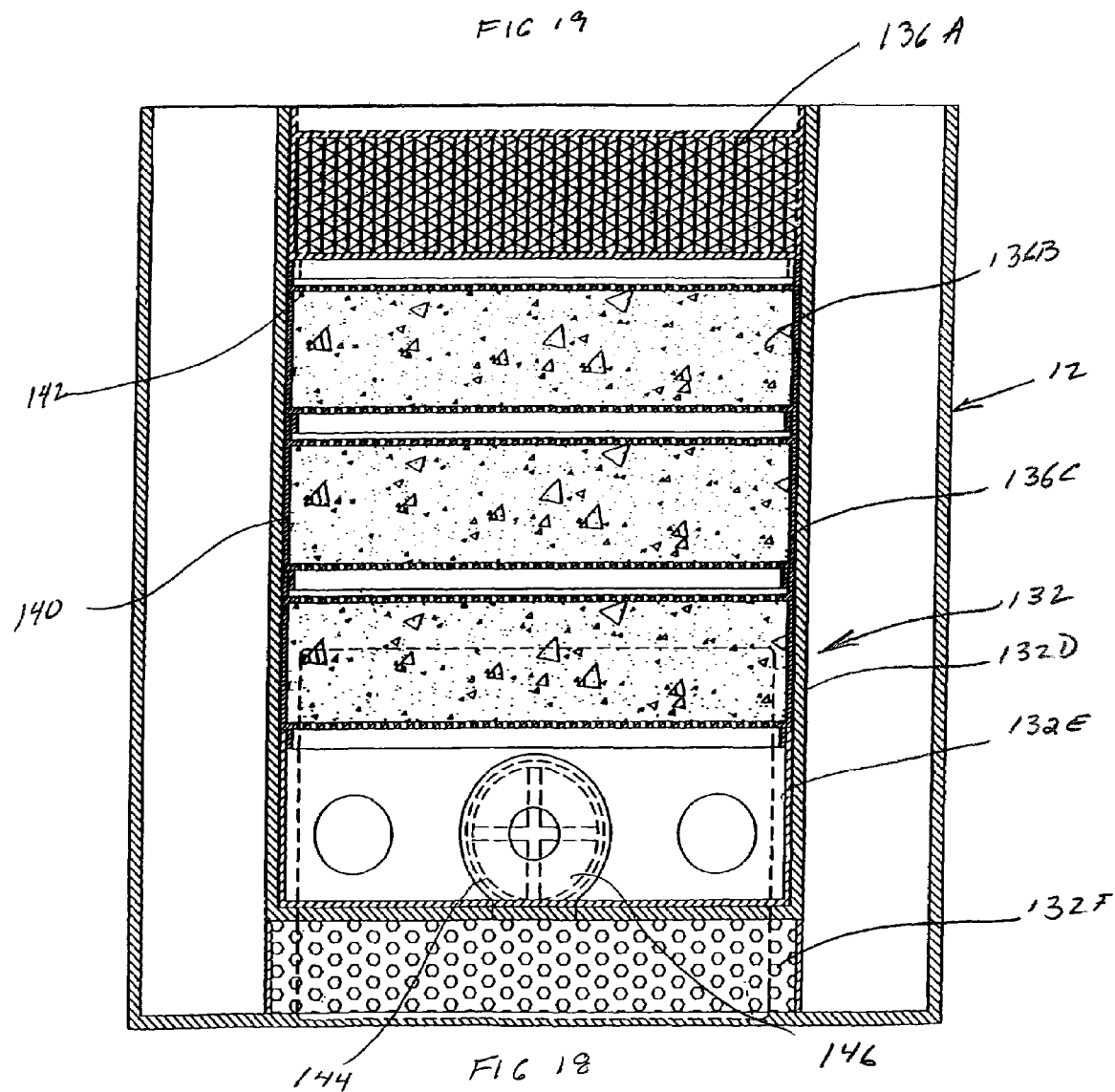
FIG. 18 is a cross-sectional elevation view of another embodiment of a filter illustrating certain features of the present invention.

Referring now to FIG. 18, there is shown an alternative form of bubble dispersing base plate in accordance with certain features of the invention. In this embodiment, a hollow cylindrical base plate 120 having a plurality of peripheral openings 122 is employed. A plurality of tubes 124 having respective pluralities of holes 126 are connected to respective ones of the peripheral openings 122. The distal ends 128 of the tubes 124 are closed. Accordingly, when a blend of water and air is pumped into the plate 120, the plate 120 distributes this blend to the several tubes 124, the tubes 124 venting the resultant bubbles to achieve the same effect achieved with the bubble dispersing plate 26.

Figure 19:
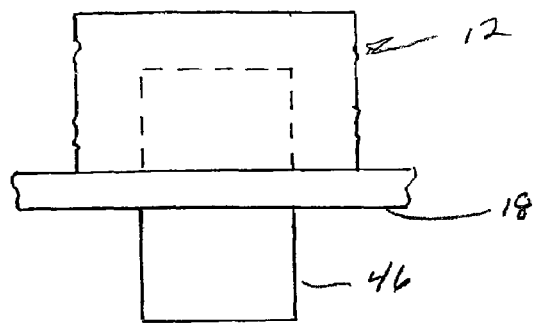
FIG. 19 is an bottom view of the filter of FIG. 18.
Figure 20:
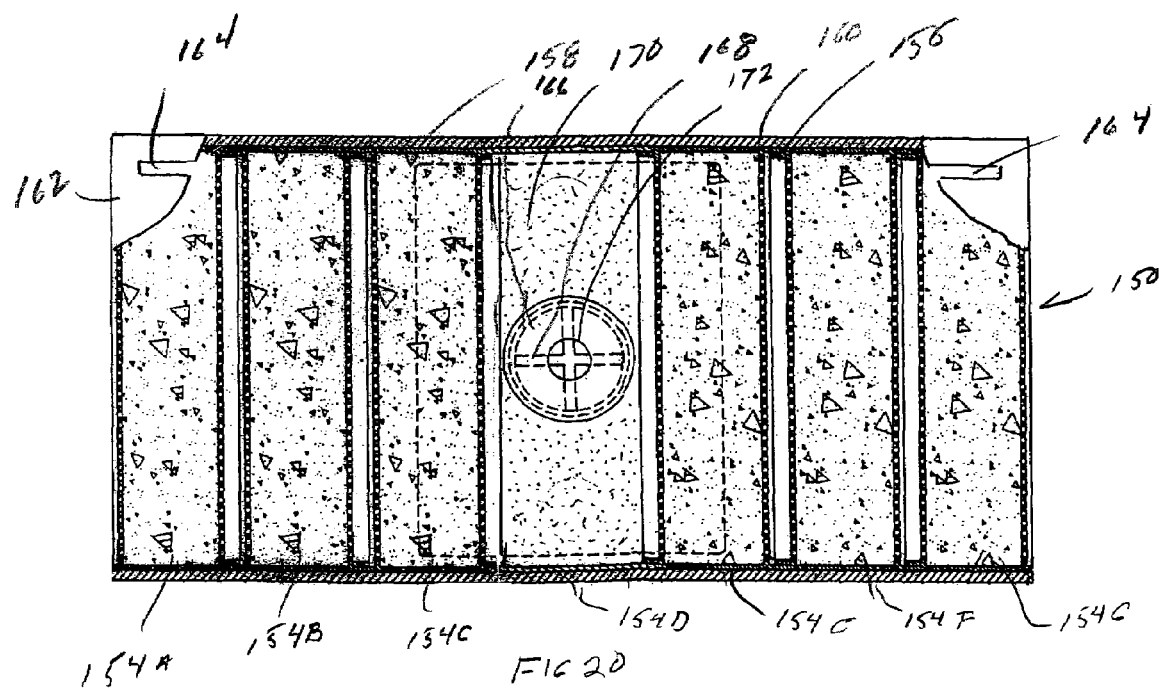
FIG. 20 is a sectional view of still another embodiment of a filter illustrating certain features of the invention.

Referring now to FIGS. 19 and 20, there is shown an alternative embodiment of a filter 132 illustrating certain features of the invention. The filter 132 includes a container 134 having a plurality, for example six, horizontal chambers 136A-136F separated by partitions 138. Each of the chambers 136A-136D contains a replaceable cartridge 140 for individual filter media. Formed at the upper and lower edge of the partitions 138 are openings 142 to allow water to circulate.

Various filter media, such as glass wool, active charcoal, ceramic beads, sands, matting, sponge(depending on the type of fish in the aquarium), may be contained separately in the cartridges 140. A pump 144 including an impeller 146 is located in one of the chambers 136A-136F, e.g., the chamber 136E, and the chamber 136F serves as an output section. As seen in FIG. 17, the filter may be located on the rear wall 18 of the tank 12 with the rotational torque generation unit located in alignment 46 with the pump 144.

In operation, when pump 144 is activated, water in the tank 12 enters the filter 132. Water entering the filter 132 flows successively through the cartridges 140 via the partition openings 142. As the water passes through each cartridge 140, it is progressively filtered.

Since each medium is contained separately in the cartridges 140, replacement of specific medium is possible. Also this system allows the flexibility of selecting and arranging the filter medium based on the needs and type of fish kept in the aquarium.

The pump 144 creates currents in the filter 132 itself allowing water to be filtered many times with one pass through the filter 132. Additional currents do the job of the usual power head pump previously needed in conventional filtration systems in addition to a filter.

Since the impeller 146 can now be placed anywhere, without an associated bulky insulated motor, this versatility translates to versatility in designing the filter 132. For example, placing the impeller 146 at the bottom of the filter 132 allows sweeping currents to keep the entire bottom of the tank 12 swept clean by the added current produced. The larger than normal output at the bottom of the filter 132 creates two systems, one causing flow through the filter 132 and the other drawing in water from the bottom of the filter 132 and re-circulating it. This causes additional currents beyond those resulting from flow through the filter 132 alone.

This pump design provides great versatility. It can create a slow flow through the filter 132 while generating very strong current in the tank 12 or gentle current in the tank 12 and vigorous current in the filter 132. This is achieved with a predetermined ratio of gravity feed replacement of water with the net water pumped out of filter system into the tank 12 causing the replacement water to fall through a column or air drawn down and held by pump 144. Equilibrium is achieved when the air column is pulled down sufficiently to have it begin to be pulled into the pump where it decreases the pump efficiency and slows the rate until a constant rate is established. This equilibrium can be controlled to again adjust characteristics of the filter 132. By restricting or enhancing flow of water entering the filter 132, this equilibrium can be regulated. For example, if entry of water into the top of the filter 132 is restricted, the replacement rate drops and more air is pumped increasing aeration and slowing the pump rate.

The size and capacity of the filter 132 can be increased by adding more cartridges 140 to the stack. The flow rate and load on the pump 144 remain constant with additional cartridges 140 being added to the filter 132. Thus, since the filter 132 is powered by gravity as water falls therethrough, no matter how high the filter 132 the size of the motor can remain the same.

One of the advantageous of the filter 132 is that 100% of the water is filtered by every cartridge as there is no path around the filter media. The only openings are at the top and bottom of each cartridge and each cartridge seals with the adjacent cartridge to maintain a single path through the media.

Another advantage is maximizing gas exchange to supply oxygen and release carbon dioxide. In essence, the filter 132 acts as an underwater wet/dry type system as the flow through the cartridge stack has the media in air with water flowing through each cartridge keeping the cartridge filled with air while water passes therethrough. This is a result of the pump rate being faster than the rate of gravity pulling the water down to the pump through the resistance to flow through the media. Equilibrium is established as air fills the stack until it reaches the pump and when it does, as soon as the air enters the pump, the efficiency of the pump drops and water catches up, then the efficiency goes up and this cycle determines the flow rate and the resulting air pumped through system rises and breaks the surface to again facilitate gas exchange at the surface. The media is constantly exposed to air allowing optimal conditions for bacteria to colonize and promote the most efficient biological filtration and the water being returned to the tank is oxygenated. The bacteria are efficiently given their own oxygen supply and they do not compete for oxygen with the fish as in most conventional designs.

The location of the filter 132 in the tank is such that filter input is always skimming the surface to further maximize gas exchange by constantly replacing surface water where most gas exchange occurs. This rapid surface movement greatly enhances the breathing of the tank 12.

The output of the filter 132 can be altered additionally by repositioning the filter 132, i.e., by repositioning the linked mounting magnets. For example, flow may be redirected by this method to allow flow to the top while restricting flow in the bottom or the proportions of flow to top and bottom may be changed.

The filter 132 is extremely versatile as cartridges 140 are building blocks which can be added to meet filtration needs for the tank 12 in which it is installed. As the needs change, the filter 132 can be quickly changed to meet the exact demands of the current conditions with quick substitution of cartridge types to meet the demands on the filter 132.

Installation of this filtration system is simple. The filter 132 is placed where desired and the rotational torque generation unit 46 aligned behind the pump section, the rotational torque generation unit and the pump 144 being held in place by magnetic attraction of their respective mounting magnets.

Figure 21:
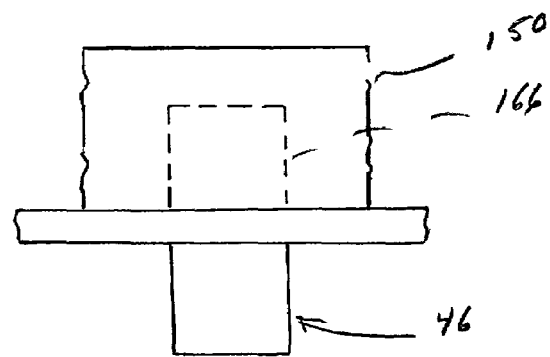
FIG. 21 is a top view of the filter of FIG. 20.
Figure 22:
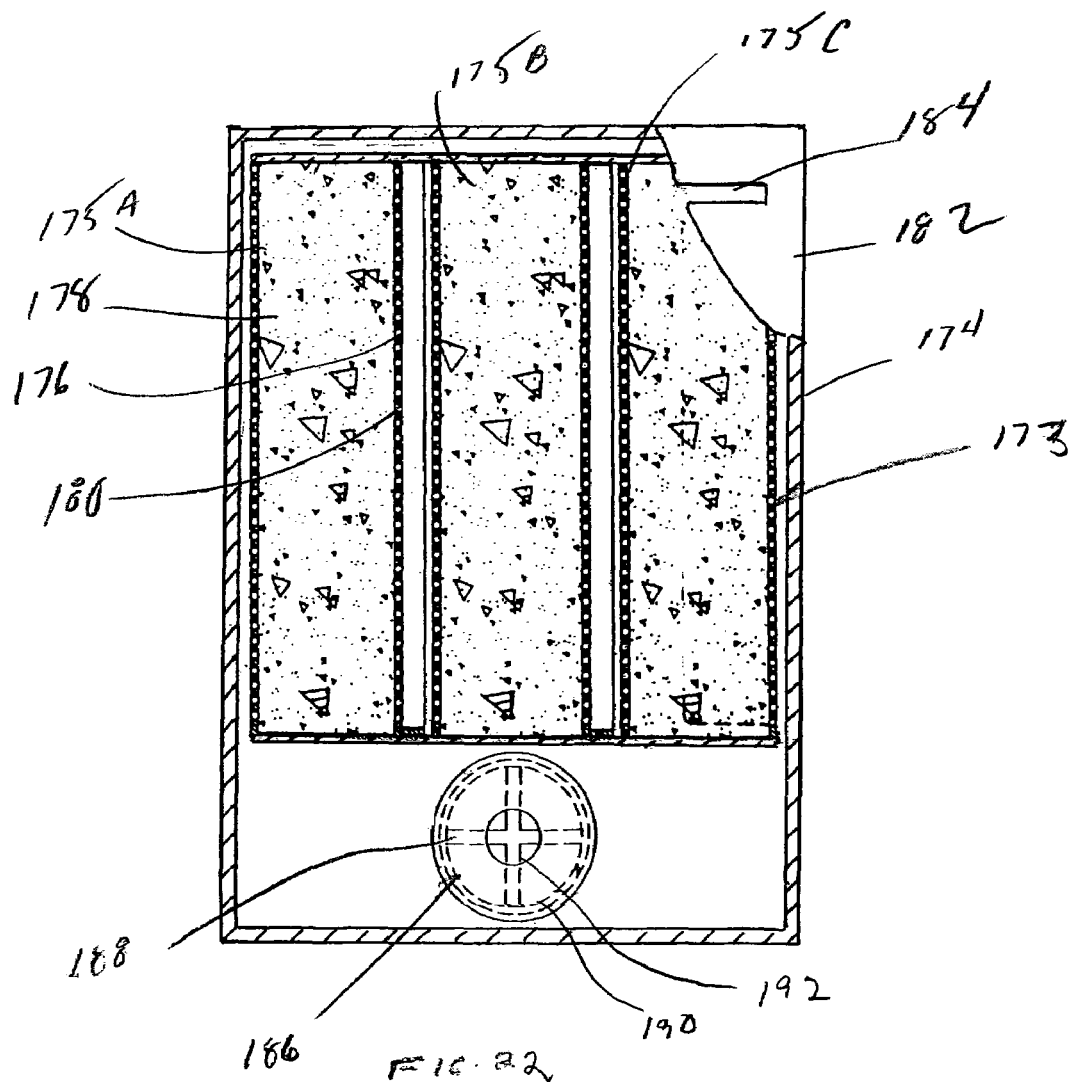
FIG. 22 is a sectional view of yet another embodiment of a filter illustrating certain features of the invention.

Referring now to FIGS. 21 and 22, there is shown a further alternative embodiment of a filter 150 illustrating certain features of the invention. The filter 50 includes a container 152 having a plurality, for example six, horizontally aligned, vertical chambers 154A-154G separated by partitions 156. Each of the chambers 154A-154F contains a replaceable cartridge 158 for individual filter media. Formed at the side edges of the partitions 156 are openings 160 to allow the water to circulate. The front wall 162 of the container has a pair of water outlet ports 164 disposed at opposite ends.

Various filter media, such as glass wool, active charcoal, ceramic beads, sands, matting, sponge(depending on the type of fish in the aquarium), may be contained separately in the cartridges 158. A pump 166 including an impeller 168 is located in the center chamber 154D surrounded by substrate media 170. A water inlet port 172 is located in the front wall 162 opposite to the pump 166. As seen in FIG. 22, the filter 150 may be located on the rear wall 18 of the tank 12 with the rotational torque generation unit 46 located in alignment with the pump 166.

In operation, when the pump 166 is activated, water in the tank 12 is pulled into the center chamber 154D through the input port 172 by the impeller 168. Water entering the filter 150 is oxygenated by the impeller and caused to flow successively through the cartridges 158 via the partition openings 160. As the water passes through each cartridge 158, it is progressively filtered. The filtered and oxygenated water then exits the filter 150 through the outlet ports 164.

As with the filter 132 of FIGS. 20 and 21, since each medium of the filter 150 is contained separately in the cartridges 158, replacement of specific medium is possible. Also this system allows the flexibility of selecting and arranging the filter medium based on the needs and type of fish kept in the aquarium.

Also like the filter 132 of FIGS. 19 and 20, the pump 166 creates currents in the filter 150 itself allowing water to be filtered many times with one pass through the filter 150. Additional currents do the job of the usual power head pump previously needed in conventional filtration systems in addition to a filter.

Figure 23:
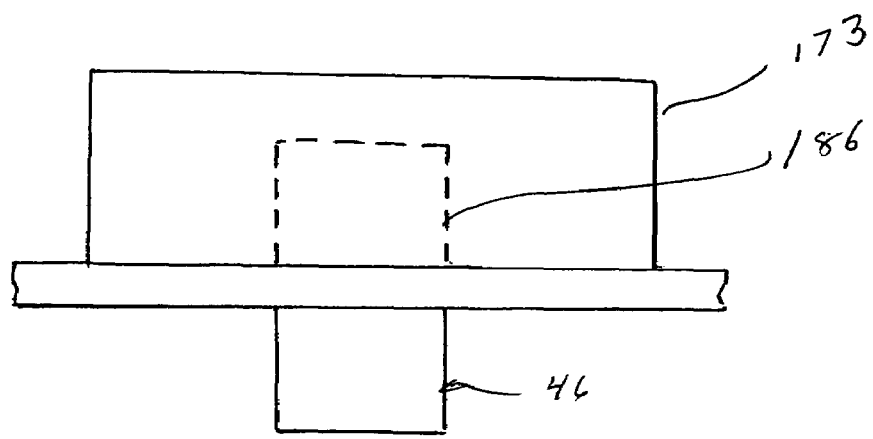
FIG. 23 is a top view of the filter of FIG. 22.

Referring now to FIGS. 22 and 23, there is shown a further alternative embodiment of a filter 173 illustrating certain features of the invention. The filter 170 includes a container 174 having a plurality, for example three, horizontally aligned, vertical chambers 175A-175C separated by partitions 176. Each of the chambers 175A-175C contains a replaceable cartridge 178 for individual filter media. Formed at the side edges of the partitions 176 are openings 180 to allow the water to circulate. The front wall 182 of the container has a water outlet port 184 disposed at the top of the container 174.

Various filter media, such as glass wool, active charcoal, ceramic beads, sands, matting, sponge(depending on the type of fish in the aquarium), may be contained separately in the cartridges 175. A pump 186 including an impeller 188 is located in a chamber 190 disposed below and in communication with the chambers 174A-174C. A water inlet port 192 is located in the front wall 194 opposite to the pump 186. As seen in FIG. 24, the filter 170 may be located on the rear wall 18 of the tank 12 with the rotational torque generation unit 46 located in alignment with the pump 186.

In operation of the filter 170, when the pump 186 is activated, water in the tank 12 is pulled into the chamber 190 through the input port 192 by the impeller 188. Water entering the filter 170 is oxygenated by the impeller 188 and caused to flow through the cartridges 178 160. As the water passes through each cartridge 178 it is filtered. The filtered and oxygenated water then exits the filter 170 through the outlet port 184.

A pump according to the invention is not limited to the specific applications described above, but can be used in any application in which a conventional pump may be used. Thus, the impeller can be put or moved anywhere. The motor can be on a track and travel the path of the track at a speed proportional to the motor's speed. The impeller will follow the motor as it is linked magnetically and the pump housing can be linked to the motor housing to have the entire assembly move along any path. It can sweep the entire bottom and vary currents for a more natural environment. It can travel at surface level or do both. It can even travel in a false bottom below the gravel to keep the gravel always clean with a strong but small current which blows up through the gravel and slowly moves continually cleaning even under heavy coral pieces or other arrangements which need not be moved to be thoroughly cleaned. Additionally, one motor can power any number of impellers using gears or a belt drive system.

The pump and impeller rotation torque generating combination can also be used to clean the inside of the tank. In this case, instead of the impeller, a cleaning disk is used, that is, a disk having a glass cleaning buffing pad. Because the disk can be moved anywhere in the tank the entire tank can be cleaned. Additionally, using a thin flexible cleaning disk enables the cleaning disk to reach and clean even normally inaccessible portions of the tank.

As should now be apparent, a pump according to the invention provides an electrically isolated, long life, low cost, simple, maintenance free, vibration free, silent pumping system which can be built in or easily installed to condition water in virtually any system.

If desired, a heating unit(not shown) may be incorporated into the bottom of the tank.

The term "free floating" as used herein means the absence of any bearings, bushings, shafts or other structures that would restrain the angle and axis of rotation of an element referred to as being "free floating."

The term "aquarium" as used herein means any tank, bowl, or other water-filled enclosure in which aquatic animals and/or plants are kept.

The term "under gravel filter" as use herein means a filter which includes a base plate having an overlying substrate of any material, such as sand, pebbles, crushed coral, dolomite, or crushed glass.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An aquarium comprising:
   a tank;
   a pump disposed in the tank; and
   an under gravel filter disposed in the tank below the pump, the under gravel filter including a bubble dispersing base plate and an overlying substrate, the plate being hollow and having a perforated top surface, the pump being connected to the plate such as to pump water into the interior of the plate to thereby cause bubbles to exit upwardly through the perforated top surface of the plate, and the substrate comprising particles having a size, shape and/or density such that particles are easily moved by the bubbles exiting from the perforated top surface of the plate.

2. An aquarium comprising:
   a tank;
   a pump disposed in the tank; and
   an under gravel filter disposed in the tank below the pump, the under gravel filter including a bubble dispersing base plate, the plate being hollow and having a perforated top surface, the pump being connected to the plate such as to pump water into the interior of the plate to thereby cause bubbles to exit upwardly through the perforated top surface of the plate, wherein the pump includes a free floating magnetic impeller.

3. An aquarium according to claim 2, further comprising a rotational torque generating unit which includes a magnetic drive disk and a motor for rotating the magnetic drive disk disposed therein, the pump and rotational torque generating unit being aligned with each other such that a magnetic field is established between the magnetic drive disk and the magnetic impeller, the magnetic field rotating upon rotation of the magnetic drive disk to thereby rotate the impeller.

4. An aquarium according to claim 3, wherein the pump includes a first housing defining a chamber and the free floating magnetic impeller is disposed in the housing.

5. An aquarium according to claim 4, wherein the rotational torque generating unit includes a second housing for housing the magnetic drive disk and the motor.

6. An aquarium according to claim 5, wherein the first and second housings are cylindrical and have respective center axes and are structured and arranged such that the second housing is rotatable within the first housing with the motor being eccentrically mounted within the second housing.

7. An aquarium according to claim 2, wherein the impeller includes a disc-shaped member having a plurality of vanes and a plurality of permanent magnets.

8. An aquarium according to claim 7, wherein the rotatable magnetic drive disk includes a plurality of permanent magnets disposed on one surface thereof, the number and location of the permanent magnets of the rotatable magnetic drive disk being coincident with the number and location of the permanent magnets of the impeller.

9. An aquarium according to claim 8, wherein the chamber has an air inlet port, a water inlet port and an outlet port coupled to the bubble dispersing base plate.

10. An aquarium according to claim 9, further comprising a mesh element for covering the inlet port to block large waste particles from entering the water inlet port.

11. An aquarium according to claim 9, wherein the first and second housings have respective flanges containing respective mounting magnets, the mounting magnets of the first and second housings being arranged to interact with each other such that first and second housings may be connected to each other by mutual magnetic attraction of their mounting magnets.

12. An aquarium comprising:
    a tank;
    a pump disposed in the tank; and
    an under gravel filter disposed in the tank below the pump, the under gravel filter including a bubble dispersing base plate and an overlying substrate, the plate being hollow and having a perforated top surface, the pump being connected to the plate such as to pump water into the interior of the plate to thereby cause bubbles to exit upwardly through the perforated top surface of the plates and the substrate comprising particles having a density slightly greater than that of water.

13. An aquarium according to claim 12, wherein the top surface has different size perforations.

14. An aquarium according to claim 13 including a water inlet port for connecting the pump to the plate.

15. An aquarium according to claim 14, wherein the perforations adjacent to the water inlet port and at four corners of the plate are larger than the rest of the perforations.

16. An aquarium according to claim 15, wherein the interior of the plate includes a plurality of guide members leading from the inlet port.

17. An aquarium according to claim 14, wherein the interior of the plate includes a plurality of guide members leading from the inlet port.

18. An aquarium according to claim 13, wherein the chamber is centrally located.

19. An aquarium according to claim 12, wherein the plate has a chamber with a raised top surface and the water inlet port is connected to the chamber.

20. An aquarium according to claim 12 further comprising an air conduit for introducing air into the pump; and the pump is connected to the plate such as to pump water and air into the interior of the plate to thereby cause bubbles to exit upwardly through the perforated top surface of the plate.

21. An aquarium according to claim 20, wherein the air conduit includes a hose connected between the pump and a source of air.

22. An aquarium according to claim 21, wherein the air conduit includes an air duct formed in a wall of the tank, a tube connected between the air duct and the pump and a passageway formed in the wall for connecting the air duct to the source of air.

23. An aquarium according to claim 22, wherein a selectively operable valve is provided for covering, uncovering or partially covering the passageway to regulate the amount of air supplied to the pump.

24. An aquarium according to claim 23, wherein the valve includes a first magnet arranged to be movable in response to an external magnetic force for covering, uncovering or partially covering the passageway to regulate the amount of air supplied to the pump.

25. An aquarium according to claim 24, wherein the first magnet is positioned on an outside surface of the wall and is movably secured to the outside surface by a second magnet positioned within the tank substantially opposite the first magnet.

26. An aquarium according to claim 25, wherein the valve includes an air filter.

27. An aquarium according to claim 26, wherein the first magnet includes an air filter.

28. An aquarium according to claim 27, wherein the first magnet has a passageway extending there through and the air filter covers the passageway on an outside surface of the first magnet.

* * * * *